(12) United States Patent
Jeong et al.

(10) Patent No.: US 8,091,377 B2
(45) Date of Patent: Jan. 10, 2012

(54) SIMULTANEOUS HEATING/COOLING MULTI AIR CONDITIONER

(75) Inventors: Ho Jong Jeong, Seoul (KR); Il Nahm Hwang, Yongin-si (KR); Baik Young Chung, Inchcon (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 11/829,352

(22) Filed: Jul. 27, 2007

(65) Prior Publication Data

US 2008/0022710 A1    Jan. 31, 2008

(30) Foreign Application Priority Data

Jul. 29, 2006   (KR) .................. 10-2006-0071811

(51) Int. Cl.
*F25B 13/00* (2006.01)

(52) U.S. Cl. ....... 62/324.6; 62/159; 62/324.1; 62/324.4; 62/160; 62/196.4; 62/199; 62/200; 62/175

(58) Field of Classification Search ............ 62/159, 62/324.1, 324.4, 324.6, 160, 196.4, 199, 62/200, 175
See application file for complete search history.

(56) References Cited

U.S. PATENT DOCUMENTS

| | | | |
|---|---|---|---|
| 5,720,179 A * | 2/1998 | Jung | 62/160 |
| 6,755,038 B2 * | 6/2004 | Hwang | 62/184 |
| 2004/0035135 A1 * | 2/2004 | Park et al. | 62/324.6 |
| 2004/0134205 A1 * | 7/2004 | Park et al. | 62/151 |
| 2005/0284163 A1 * | 12/2005 | Hwang et al. | 62/222 |
| 2006/0090495 A1 * | 5/2006 | Choi et al. | 62/324.1 |
| 2006/0137381 A1 | 6/2006 | Choi et al. | |

FOREIGN PATENT DOCUMENTS

| | | |
|---|---|---|
| EP | 1 275 913 A2 | 1/2003 |
| EP | 1 655 555 A2 | 5/2006 |
| EP | 1 793 179 A1 | 6/2007 |

OTHER PUBLICATIONS

European Search Report dated Feb. 9, 2011.

* cited by examiner

*Primary Examiner* — Cheryl J Tyler
*Assistant Examiner* — Jonathan Koagel
(74) *Attorney, Agent, or Firm* — KED & Associates LLP (57) ABSTRACT

A heat pump capable of performing heating and cooling simultaneously is provided. The heat pump includes a compressor, indoor devices that heat or cool an indoor space, outdoor heat exchangers, and switching devices. The outdoor heat exchangers are configured to individually operate as a condenser or an evaporator depending on a ratio of heating to cooling of the indoor devices. When an operation mode is changed, continuous heating and cooling is performed without stopping the system.

27 Claims, 9 Drawing Sheets

SIMULTANEOUS HEATING/COOLING MULTI AIR CONDITIONER

BACKGROUND

1. Field

The application relates to an air conditioning system that includes a plurality of indoor units for separately heating and cooling multiple different rooms of a building.

2. Background

An air conditioner is a device for heating or cooling an internal space of, for example, a building. To efficiently cool or heat an indoor space which is divided into a plurality of rooms, a multi air conditioner includes a few large heating and cooling units which are used to generate refrigerant flows that can be used to heat or cool many separate rooms in the building. The multi air conditioner includes an outdoor unit, and a plurality of indoor units connected to the outdoor unit and installed in the respective rooms.

The related art multi air conditioners can only operate in one of a cooling or heating mode. Because the related art multi air conditioner operates in only one of the cooling and heating modes, there is a problem when heating is required for some rooms, while cooling is required for others.

Thus, there is a need for multi air conditioner that allows indoor units to operate individually in a cooling mode or heating mode depending on whether rooms in which the indoor units are installed require cooling or heating.

BRIEF DESCRIPTION OF THE DRAWINGS

The embodiments will be described in detail with reference to the following drawings, in which like reference numerals refer to like elements, and wherein.

DETAILED DESCRIPTION

Figure 1:
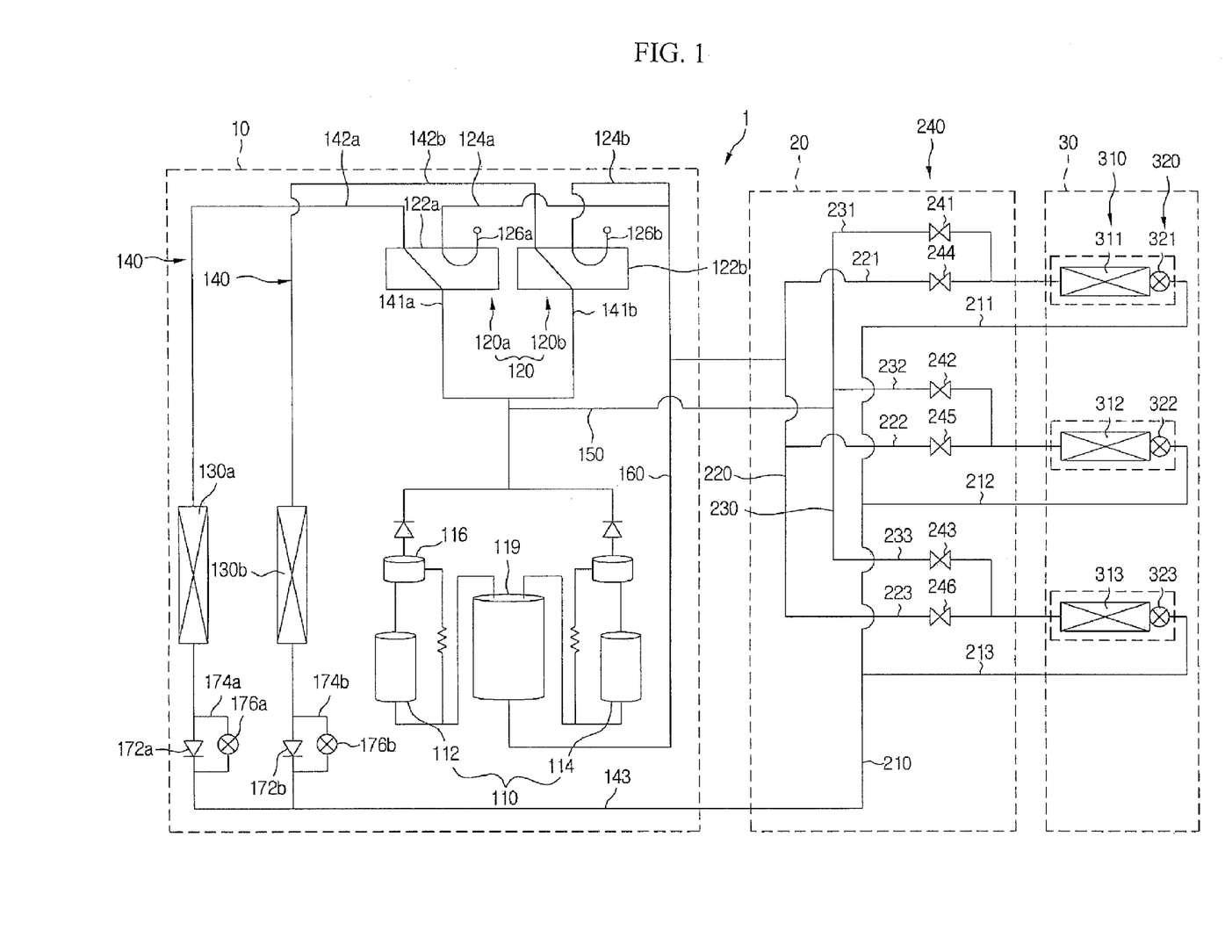
FIG. 1 is a view illustrating a configuration of a simultaneous heating/cooling multi air conditioner.

FIG. 1 is a view illustrating a configuration of a simultaneous heating/cooling multi air conditioner. Referring to FIG. 1, the simultaneous heating/cooling multi air conditioner can cool or heat all of rooms, but also can cool some of rooms, while heating others. That is, the simultaneous heating/cooling multi air conditioner includes a full heating mode for heating each of the rooms, a heating-dominant mode for cooling some of the rooms while dominantly heating others, a full cooling mode for cooling all of the rooms, and a cooling-dominant mode for heating some of the rooms while dominantly cooling others.

To allow operations in the above modes, the simultaneous heating/cooling multi air conditioner includes an outdoor unit 10 installed outdoors, a plurality of indoor units 30 installed in respective rooms, and a divider 20 connecting the outdoor unit 10 with the indoor units 30. The outdoor unit 10 includes a compressor 110 and outdoor heat exchangers 130a 130b. The divider 20 includes a guide pipe unit connecting the outdoor unit 10 with the indoor units 30, and a valve unit controlling the refrigerant flow in the guide pipe part. Each of the indoor units 30 includes an indoor heat exchanger 310, and an electronic expansion valve 320.

Constructions and functions of the outdoor unit 10, the divider 20, and the indoor units 30 will now be described in detail.

The outdoor unit 10 includes the compressor 110 which compresses refrigerant. Typically, multiple individual compressors would be used in the multi air conditioner. An accumulator 119 allows gaseous refrigerant to flow into the compressor 110. One or more oil separators 116 separate oil from refrigerant discharged from the compressors 110, and route the separated oil back into the compressors 110. A pipe unit connected to the compressor 110 guides refrigerant to the divider 20 and guides refrigerant from the divider 20 back to the compressor 110. A switching unit 120 is provided on the pipe unit within the outdoor unit 10, and switches the flow of refrigerant depending on an operational state of the air conditioner.

In detail, the compressor 110 includes an inverter compressor 112 operating at a variable speed, and a constant-speed compressor 114 operating at a constant speed. When the capacity of the indoor units 30 being used is small, the inverter compressor 112 is activated. When the capacity of the indoor units 30 gradually increases and exceeds the capacity of the inverter compressor 112, the constant-speed compressor 114 is activated. In other embodiments, additional compressors could also be used. Also, all the compressors might be of the same type. Further, additional other types of compressors could also be used.

The pipe unit includes a first connection pipe 140 connecting a discharge end of the compressor 110 with the outdoor heat exchanger 130. A second connection pipe 150 connects a front end side 141 of the first connection pipe 140 with the divider 20 to guide only a high-pressure gaseous refrigerant to the divider 20. A third connection pipe 160 connects a suction end of the compressor 110 with the divider 20.

The outdoor heat exchanger 130 includes a first outdoor heat exchanger 130a and a second outdoor heat exchanger 130b that are connected together in parallel. The switching unit 120 also includes the first switching unit 120a and the second switching unit 120b. The first switching unit 120a selectively connects the first outdoor heat exchanger 130a with the compressor 110, and the second switching unit 120b selectively connects the second outdoor heat exchanger 130b with the compressor 110.

The front end side 141 of the first connection pipe 140 connected to the discharge end of the compressor 110 branches into two pipes that are respectively connected to the switching units 120a and 120b. There are also two pipes leading from the switching units to the outdoor heat exchangers. The pipes exiting the outdoor heat exchangers 130a and 130b converge at a discharge end of each of the outdoor heat exchangers 130a and 130b.

Here, the plurality of outdoor heat exchangers 130 and the plurality of switching units 120 are provided so as to change functions of the plurality of outdoor heat exchangers 130 and thus meet a requited heating/cooling ratio when a heating/cooling ratio changes while the simultaneous heating/cooling multi air conditioner is operating in a predetermined mode. Accordingly, the heating/cooling performance can be constantly maintained, and the heating/cooling can be continuously performed.

Depending on the heating/cooling ratio, all of the outdoor heat exchangers 130 may operate as evaporators, all may operate as condensers, or some of the outdoor heat exchangers may operate as condensers while others operate as evaporators. The detailed description thereof will be described later with reference to accompanying drawings.

In the embodiment shown in the drawings, there are two outdoor heat exchangers coupled to two corresponding switching units. However, in other embodiments, more heat exchangers and switching units could be provided.

The first switching unit 120a includes a 4-way valve 122a provided at the first connection pipe 140 on a section between the second connection pipe 150 and the first outdoor heat exchanger 130a. An auxiliary connection pipe 124a connects the 4-way valve 122a with the third connection pipe 160. A closed pipe 126a is also connected to the valve 122a for pressurization such that one side of a valve body (128 of FIG. 3) is continuously pressurized during a full heating operation or a heating-dominant operation. An operation of the valve body will be described later with reference to accompanying drawings. Likewise, the second switching unit 120b includes a four-way valve 122b. An auxiliary connection pipe 124b leads to the third pipe 160, and a closed pipe 126b is coupled to the valve 122b for pressurization.

By the above-mentioned structure of the pipe unit and the switching unit 120, a section 143 of the first connection pipe 140 between the outdoor heat exchanger 130 and the divider 20 is defined as a 'high-pressure liquefied refrigerant section' through which high-pressure liquefied refrigerant flows.

The second connection pipe 150 is defined as a 'high-pressure gaseous refrigerant section. Refrigerant in a high-pressure gaseous state passes through the second connection pipe 150 after leaving the compressors 110.

The third connection pipe 160 is defined as a low-pressure gaseous refrigerant section. Low-pressure gaseous refrigerant flows through the third connection pipe 160. This will be clearly understood through the description of an operation to be made later in detail.

When the outdoor heat exchanger 130 operates as a condenser, refrigerant being discharged from the outdoor heat exchanger 130 may be continuously introduced to the divider 20 through the high-pressure liquefied refrigerant section of the first connection pipe 140. When the outdoor heat exchanger 130 operates as an evaporator, refrigerant having expanded may be introduced to the outdoor heat exchanger 130.

Check valves 172a and 172b, parallel pipes 174a and 174b, and outdoor electronic expansion valves 176a and 176b are also coupled to one side of the outdoor heat exchangers 130a, 130b. The check valves 172a and 172b are provided in the high-pressure liquefied refrigerant section, and they act to cut off refrigerant flow when the outdoor heat exchanger 130 operates as an evaporator. They pass the refrigerant when the outdoor heat exchanger 130 operates as a condenser.

The parallel pipes 174a and 174b are connected to the high-pressure liquefied refrigerant section in front of and at the rear of the respective check valves 172a and 172b. The parallel pipes 174a, 174b guide refrigerant flow when the outdoor heat exchanger 130 operates as an evaporator. The outdoor electronic expansion valves 176a and 176b are provided in the parallel pipes 174a and 174b, and expand refrigerant being introduced to the outdoor heat exchangers 130, respectively.

The divider 20 includes a guide pipe unit and a valve unit 240. The guide pipe unit guides to the indoor unit 30 refrigerant introduced to the first connection pipe 140 or the second connection pipe 150 of the outdoor unit 10, and also guides refrigerant heat-exchanged in the indoor units 30 to the first connection pipe 140 or the third connection pipe 160 of the outdoor unit 10. The valve unit 240 controls refrigerant flow of the guide pipe unit depending on operation conditions.

In detail, the guide pipe unit includes a high-pressure liquefied refrigerant connection pipe 210 connected to the high-pressure liquefied refrigerant section of the first connection pipe 140. High-pressure liquefied refrigerant branch pipes 211, 212 and 213 branch from the high-pressure liquefied refrigerant connection pipe 210, and connect to the respective indoor units 30. A high-pressure gaseous refrigerant connection pipe 230 connects the second connection pipe 150 to high-pressure gaseous refrigerant branch pipes 231, 232 and 233, which themselves are connected to the respective indoor units 30. Low-pressure gaseous refrigerant branch pipes 221, 222 and 223 are connected in parallel with the high-pressure gaseous refrigerant branch pipes 231, 232 and 233, and guide low-pressure gaseous refrigerant into a low-pressure gaseous refrigerant connection pipe 220. The low-pressure gaseous refrigerant connection pipe 220 is connected to the third connection pipe 160.

The valve unit 240 includes high-pressure side valves 241, 242 and 243 provided on the respective high-pressure gaseous refrigerant branch pipes 231, 232 and 233. Low-pressure side valves 244, 245 and 246 are provided on the respective low-pressure gaseous refrigerant branch pipes 221, 222 and 223. The high-pressure and low-pressure side valves are individually selectively turned ON/OFF depending on operational states of the respective indoor units 30.

Each indoor unit 30 includes an indoor heat exchanger 310 and an indoor electronic expansion valve 320 provided between the high-pressure liquefied refrigerant branch pipe and the gaseous refrigerant branch pipe. An indoor fan (not shown) forcibly blows air over the indoor heat exchangers to either heat or cool the indoor spaces.

Refrigerant flows through the low-pressure gaseous refrigerant pipes during a full cooling operation, and refrigerant flows through the high-pressure gaseous refrigerant pipes during a full heating operation. That is, in the full cooling operation, the high-pressure side valves 241, 242 and 243 are closed, and the low-pressure side valves 244, 245 and 246 are opened, so that the refrigerant flows to the low-pressure gaseous refrigerant branch pipes 221, 222 and 223. In the full heating operation, the low-pressure side valves 244, 245 and 246 are closed, and the high-pressure side valves 241, 242 and 243 are opened, so that the refrigerant flows to the high-pressure gaseous refrigerant branch pipes 231, 232 and 233.

The various different operational states of the simultaneous heating/cooling multi air conditioner will now be described.

Figure 2:
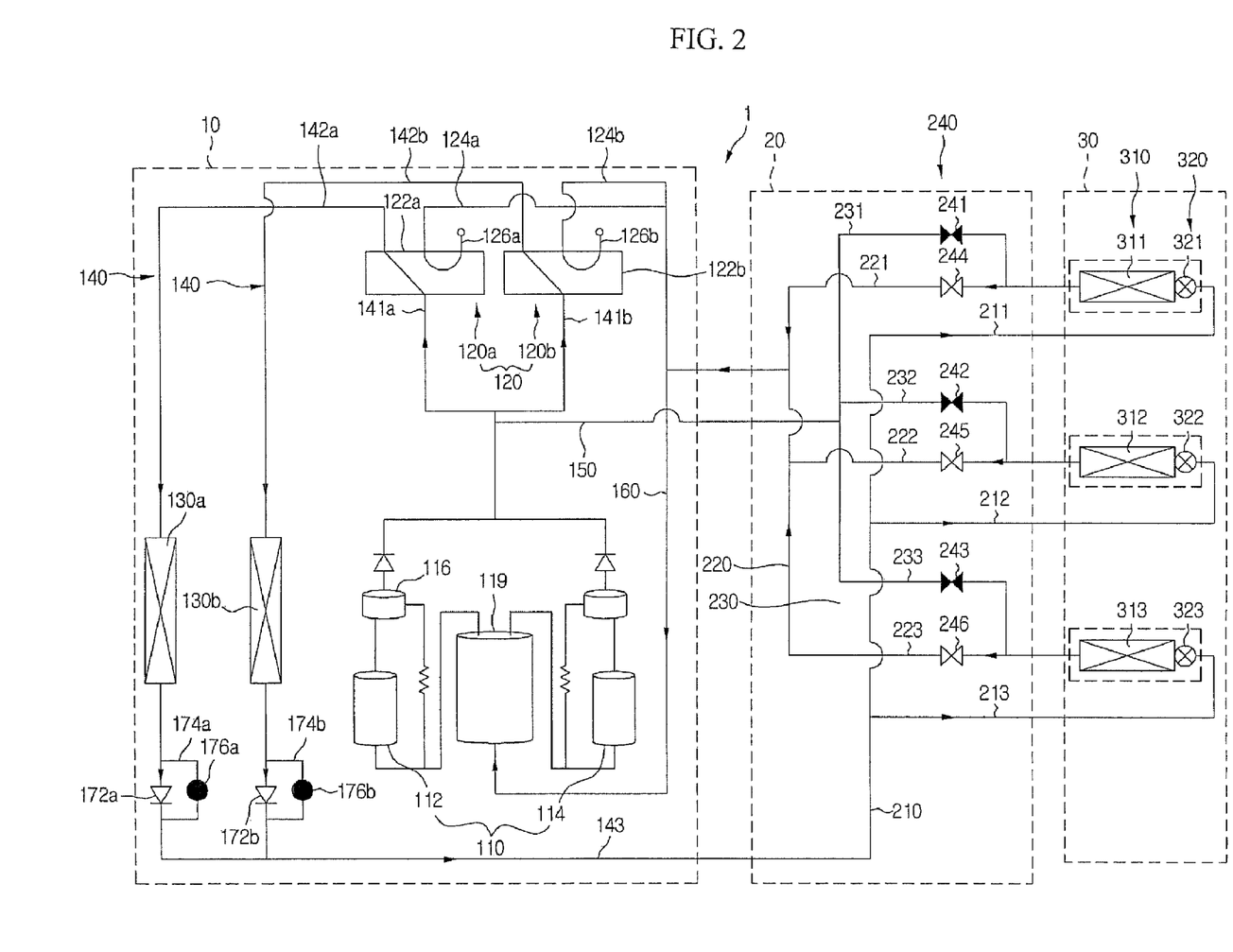
FIG. 2 is a view illustrating an operational state of the multi air conditioner when the multi air conditioner operates in a full cooling mode.
Figure 3:
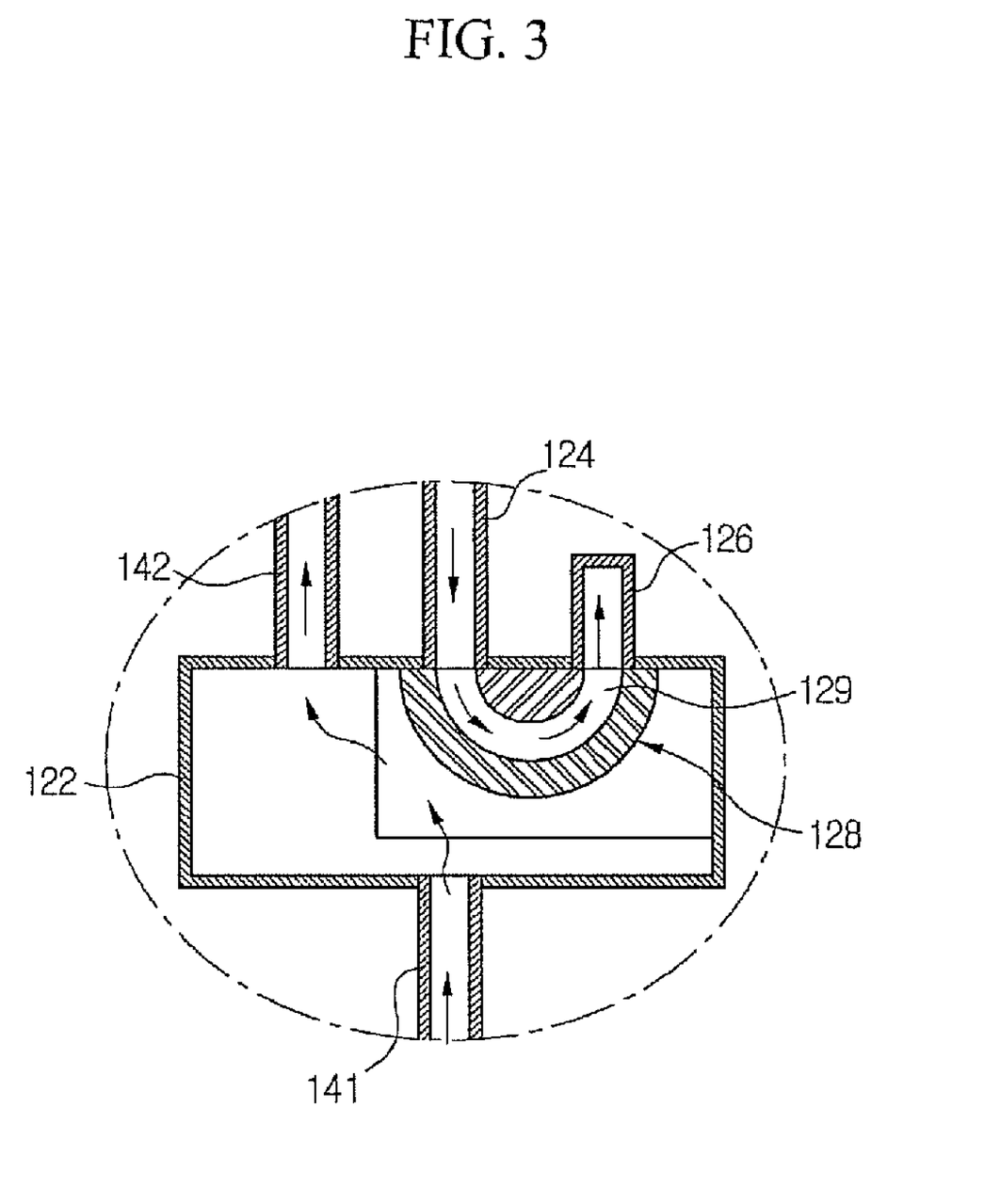
FIG. 3 is a view illustrating a first operational state of a switching unit of the multi air conditioner of FIG. 1.

FIG. 2 is a view illustrating an operational state when the simultaneous heating/cooling multi air conditioner operates in a full cooling mode. FIG. 3 is a view illustrating a first operational state of the switching units of the simultaneous heating/cooling multi air conditioner.

Referring to FIGS. 2 and 3, in the full cooling mode, the high-pressure side valves 241, 242 and 243 of the respective high-pressure gaseous refrigerant branch pipes 231, 232 and 233 are closed, and the low-pressure side valves 244, 245 and 246 of the low-pressure gaseous refrigerant branch pipes 221, 222 and 223 are opened. High-pressure gaseous refrigerant discharged from the compressor 110 flows along the front end sides 141a and 141b of the first connection pipe 140, and is introduced to rear end sides 142a and 142b of the first connection pipe 140 via the switching units 120a and 120b, respectively.

The refrigerant introduced to the rear end sides 142a and 142b of the first connection pipe 140 is condensed while passing through the outdoor heat exchangers 130a and 130b, respectively. That is, the outdoor heat exchangers 130a and 130b operate as condensers. The refrigerant condensed while passing through the outdoor heat exchangers 130a and 130b is introduced to the divider 20 via the check valves 172a and 172b along the high-pressure liquefied refrigerant section 143 of the first connection pipe 140. Of course, the outdoor electronic expansion valves 176a and 176b are in a closed state.

The refrigerant introduced to the divider 20 is introduced to the high-pressure liquefied refrigerant connection pipe 210, and the refrigerant introduced to the high-pressure liquefied refrigerant connection pipe 210 is divided into the high-pressure liquefied refrigerant branch pipes 211, 212 and 213. Then, the refrigerant is expanded while passing through each indoor electronic expansion valve 321, 322, 323 and is evaporated while passing through each indoor heat exchanger 310. The air introduced into each indoor unit 30 is cooled while passing through each indoor heat exchanger 310, and the cool air is discharged to each room, thereby performing cooling on each room.

Thereafter, the evaporated refrigerant passes through each of the low-pressure gaseous refrigerant branch pipes 221, 222 and 223, and the refrigerant merges at the low-pressure gaseous refrigerant connection pipe 220, and then is introduced to the third connection pipe 160. The refrigerant introduced to the third connection pipe 160 passes through the accumulator 119 and then is sucked into the compressor 110.

As illustrated in FIG. 3, the valve body 128 within the switching units 120a and 120b is located to the right, to connect the front end side 141 of the first connection pipe 140 to the rear end side 142 thereof. An electric force, such as provided by a solenoid, (i.e., a force used for an initial operation of the valve body) and pressure of refrigerant being discharged from the compressor 110 is used to move the valve body. The refrigerant is discharged to the rear end side 142 of the first connection pipe 140, and it continuously presses the valve body 128 to the right such that, refrigerant discharged from the compressor flows toward the outdoor heat exchanger 130.

Since the valve body 128 is moved to the right, the auxiliary connection pipes 124a and 124b respectively communicate with the closed pipes 126a and 126b, thereby blocking the flow of the refrigerant. Thus, the refrigerant introduced to the third connection pipe 160 from the low pressure gas refrigerant pipe 220 can smoothly flow toward the compressor 110.

Figure 4:
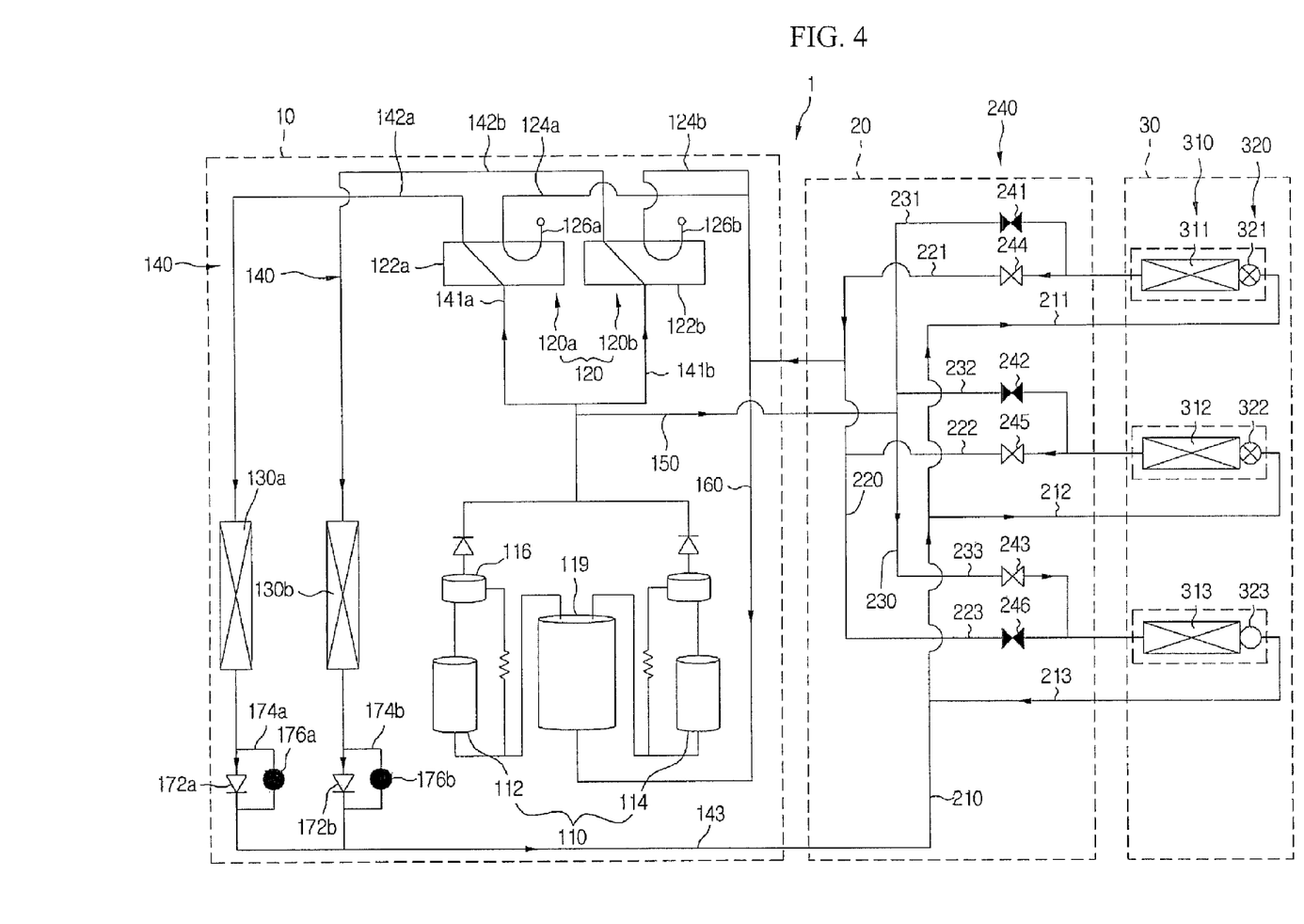
FIG. 4 is a view illustrating an operational state of the multi air conditioner when the multi air conditioner operates in a cooling-dominant mode.

FIG. 4 is a view illustrating an operational state when the simultaneous heating/cooling multi air conditioner operates in the cooling-dominant mode. In this mode, the majority of the indoor spaces are being cooled, but some are being heated.

Referring to FIG. 4, in the cooling-dominant mode, the low-pressure side valves 244 and 245 of the low-pressure gaseous refrigerant branch pipes 221 and 222 are opened for rooms requiring cooling so as to introduce refrigerant to the low-pressure gaseous refrigerant branch pipes 221 and 222. For a room requiring heating, the high-pressure side valve 243 of the high-pressure gaseous refrigerant branch pipe 233 is opened so as to introduce refrigerant to the high-pressure gaseous refrigerant branch pipe 233. For rooms requiting heating, low pressure side valve 246 of the low-pressure gaseous refrigerant branch pipe 223 is closed.

A portion of high-pressure gaseous refrigerant discharged from the compressor 110 is introduced from the front end side 141 of the first connection pipe 140 to the high-pressure gaseous refrigerant connection pipe 230 of the divider 20 along the second connection pipe 150. The remaining high-pressure gaseous refrigerant discharged from the compressor 110 is introduced to the rear end sides 142a and 142b of the first connection pipe 140 by the respective switching units 120a and 120b. The high-pressure gaseous refrigerant introduced to the rear end sides 142a and 142b is introduced to the respective outdoor heat exchangers 130a and 130b and is condensed. That is, the outdoor heat exchangers 130a and 130b operate as condensers.

The high-pressure refrigerant condensed while passing through the outdoor heat exchangers 130a and 130b respectively passes through the check valves 172a and 172b, and is introduced to the high-pressure liquefied refrigerant connection pipe 210 of the divider 20 along the high-pressure liquefied refrigerant section 143 of the first connection pipe 140.

The refrigerant introduced to the high-pressure liquefied refrigerant connection pipe 210 of the divider 20 is divided into the first and second high-pressure liquefied refrigerant branch pipes 211 and 212. The divided refrigerant is expanded while passing through the first and second indoor electronic expansion valves 321, and 322, and is evaporated while passing through the first and second indoor heat exchangers 311 and 312. The indoor air is blown across the first and second indoor heat exchangers 311 and 312, and the cool air is discharged to the inside, thereby cooling rooms that requires cooling. Thereafter, the evaporated refrigerant passes through the first and second low-pressure gaseous refrigerant branch pipes 221 and 222, is collected at the low-pressure gaseous refrigerant connection pipe 220, and then is sucked into the compressor 110.

Simultaneously, the refrigerant introduced to the high-pressure gaseous refrigerant connection pipe 230 of the divider 20 is introduced to the third high-pressure gaseous refrigerant branch pipe 233, and is condensed through the third indoor heat exchanger 313. The indoor air blown through the third indoor heat exchanger 313 is discharged to a third room, thereby heating the room requiring heat.

Then, the refrigerant is collected at the high-pressure liquefied refrigerant connection pipe 210 via the opened third indoor electronic expansion valve 323 and the third high-pressure liquefied refrigerant branch pipe 213. Thus, the refrigerant used for heating the third room joins the refrigerant in the high pressure liquefied refrigerant pipe 210 and is divided into the first and second high-pressure liquefied refrigerant branch pipes 211 and 212 if necessary, and then is used to cool the first and second rooms.

Figure 5:
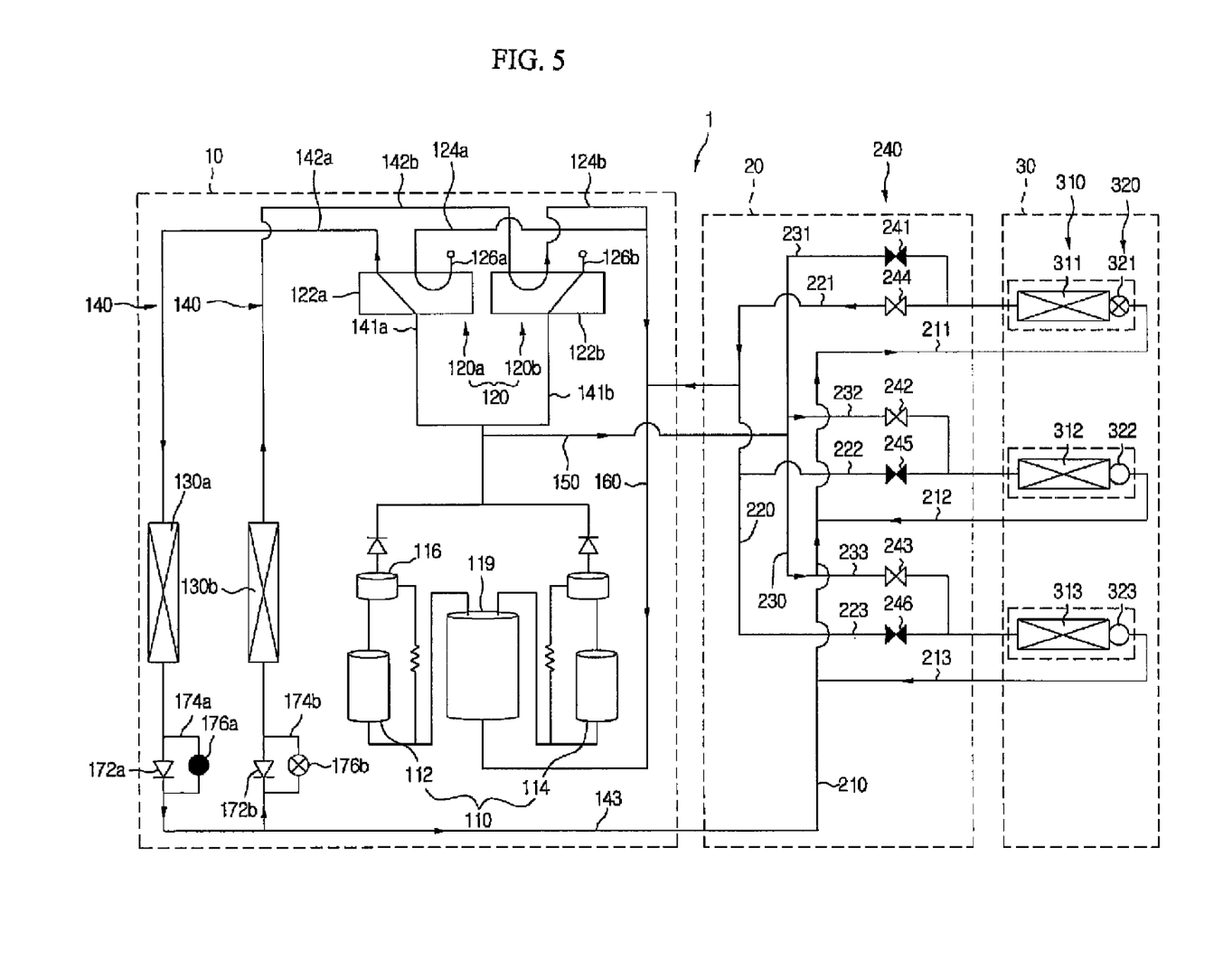
FIG. 5 is a view illustrating an operational state of the multi air conditioner when the multi air conditioner operates in a heating dominant mode.
Figure 6:
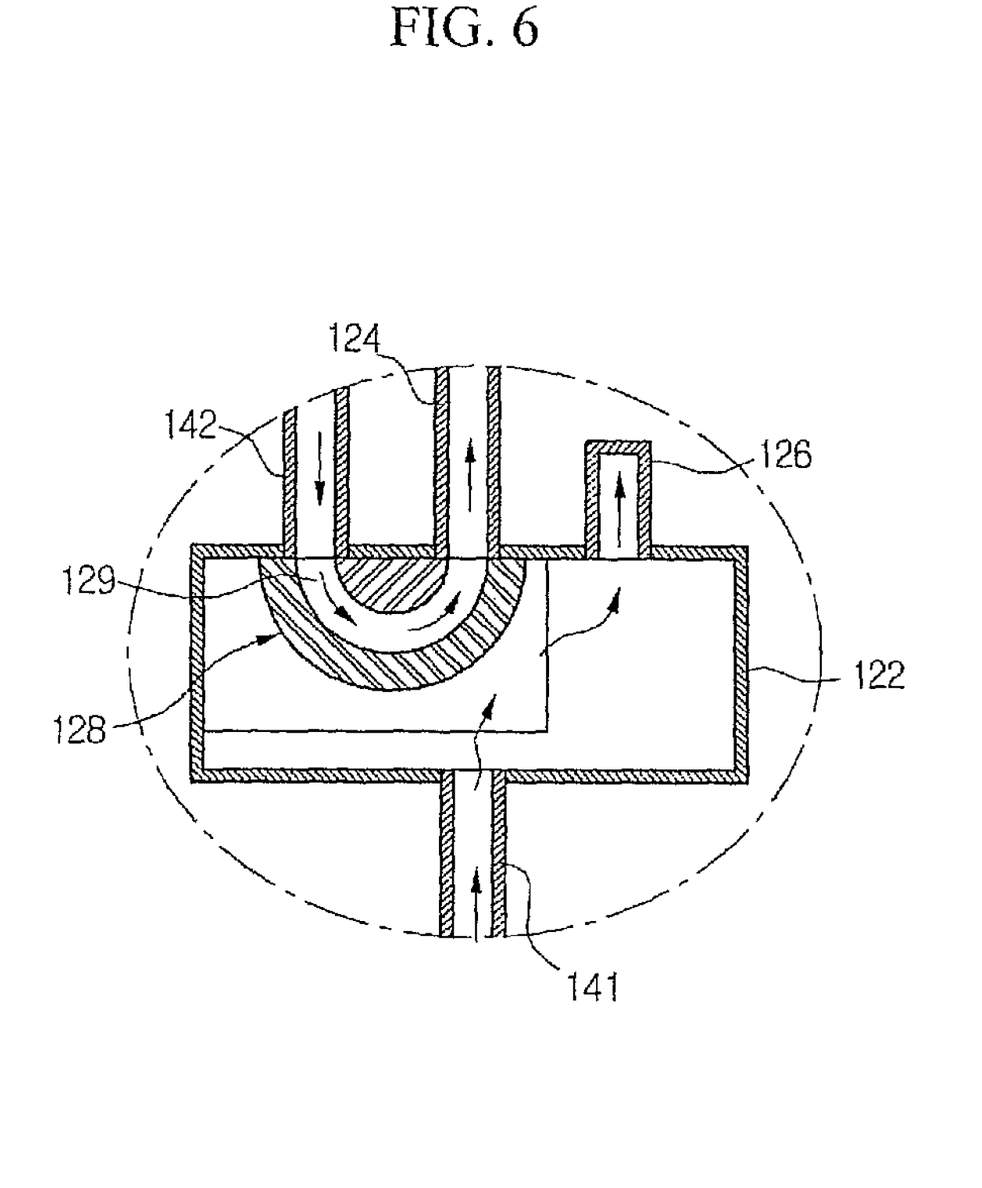
FIG. 6 is a view illustrating a second operational state of a switching unit of the multi air conditioner.

FIG. 5 is a view illustrating an operational state when a heating ratio increases while the simultaneous heating/cooling multi air conditioner operates in the full cooling mode or the heating-dominant mode. FIG. 6 is a view illustrating a second operational state of the switching unit of the air conditioner. Referring to FIGS. 5 and 6, when the heating ratio increases while the simultaneous heating/cooling multi air conditioner operates in the full cooling mode or the cooling-dominant mode, some of the outdoor heat exchangers 130 operate as condensers, and others operate as evaporators.

That is, when the simultaneous heating/cooling multi air conditioner including a plurality of indoor units operates in the full cooling mode or the cooling-dominant mode, each of the outdoor heat exchangers 130 operates as a condenser as described with reference to FIGS. 2 and 4. An indoor heat exchanger of a room operating for cooling serves as an evaporator, and an indoor heat exchanger of a room operating for heating serves as a condenser.

In this state, if the ratio of indoor units operating for heating increases, the number of heat exchangers serving as evaporators decreases within the entire system, lowering evaporation performance. Accordingly, heating and cooling performance is deteriorated. To prevent such deterioration in heating and cooling performance, some of the outdoor heat exchangers 130 operating as condensers are switched so that they operate as evaporators instead.

In detail, a high-pressure gaseous refrigerant discharged from the compressor 110 is divided and flows to the first end side 141a and the second end side 141b of the first connection pipe 140, and through the second connection pipe 150. The refrigerant introduced to the first end side 141a of the first connection pipe 140 is introduced to the first rear end side 142a of the first connection pipe 140 by the first switching unit 120a. In contrast, the second switching unit 120b is switched to a configuration shown in FIG. 6. In this configuration, since the second front end side 141b is connected to the second closed pipe 126b for pressurization. The refrigerant introduced to the second front end side 141b of the first connection pipe 140 cannot flow any longer. The refrigerant introduced to the second connection pipe 150 flows to the high-pressure gaseous refrigerant connection pipe 230 of the divider 20.

The refrigerant introduced to the first rear end side 142a of the first connection pipe 140 is condensed while passing through the first outdoor heat exchanger 130a. That is, the first outdoor heat exchanger 130a operates as a condenser.

The refrigerant condensed while passing through the first outdoor heat exchanger 130a is introduced to the high-pressure liquefied refrigerant connection pipe 210 of the divider 20 via the first check valve 172a along the high-pressure liquefied refrigerant section 143 of the first connection pipe 140. Here, the first outdoor electronic expansion valve 176a is closed.

The refrigerant introduced to the high-pressure liquefied refrigerant connection pipe 210 of the divider 20 is routed to the first high-pressure liquefied refrigerant branch pipe 211, and is then is expanded while passing through the first indoor electronic expansion valve 321, and is evaporated while passing through the first indoor heat exchanger 311. The indoor air that is blown through the first indoor heat exchanger 311 is discharged to the inside, thereby cooling a room that requires cooling. Thereafter, the evaporated refrigerant passes through the first low-pressure gaseous refrigerant branch pipe 221, is introduced to the low-pressure gaseous refrigerant connection pipe 220, and then is sucked into the compressor 110 via the third pipe 160.

Simultaneously, the refrigerant introduced to the high-pressure gaseous refrigerant connection pipe 230 of the divider 20 is introduced to the second and third high-pressure gaseous refrigerant branch pipes 232 and 233, and then is condensed while passing through the second and third indoor heat exchangers 312 and 313. The indoor air blown through the second and third indoor heat exchangers 312 and 323 is discharged to the inside at a temperature increased by heat-exchange, thereby heating the second and third rooms that require heating.

The condensed refrigerant passes through the opened second and third indoor electronic expansion valves 322 and 323, and the second and third high-pressure liquefied refrigerant branch pipes 212 and 213, and then merges into the high-pressure liquefied refrigerant connection pipe 210. The refrigerant used for the heating is introduced to the high-pressure liquefied refrigerant branch pipe of a room that requires cooling, and then the introduced refrigerant is used to cool the room.

A portion of refrigerant introduced to the high-pressure liquefied refrigerant section 143 via the first outdoor heat exchanger 130a and the first check valve 172a is introduced to the second parallel pipe 174b. The refrigerant introduced to the second parallel pipe 174b is expanded while passing through the second outdoor electronic expansion valve 176b, and is evaporated while passing through the second outdoor heat exchanger 130b. That is, the second outdoor heat exchanger 130b operates as an evaporator.

The refrigerant evaporated while passing through the second outdoor heat exchanger 130b flows along the second rear end side 142b of the first connection pipe 140, and is introduced to the compressor 110 after sequentially passing through the second auxiliary connection pipe 124b and the third connection pipe 160 by the second 4-way valve 122b.

In order for the second outdoor heat exchanger 130b to operate as an evaporator, as illustrated in FIG. 6, the valve body 128 of the second switching unit 120b is moved to the left by an electronic force and pressure of the refrigerant flowing through the second switching unit 122b. As a result, the front end side 141 of the first connection pipe 140 communicates with the closed pipe 126 for pressurization. Also, a predetermined amount of refrigerant is moved to the closed pipe 126 for pressurization, thereby continuously pressurizing the valve body 128b to the left. The rear end side 142 of the first connection pipe 140 and the auxiliary connection pipe 124 communicate with each other through a passage 129 within the valve body 128, thereby moving a low-pressure gaseous refrigerant being discharged from the second outdoor heat exchanger 130b toward a suction side of the compressor 110.

The plurality of outdoor heat exchangers 130 are constructed such that some of the outdoor heat exchangers 130 operate as condensers and others operate as evaporators depending on the heating/cooling ratio. Accordingly, deterioration of the heating/cooling performance is prevented even if the heating/cooling ratio changes. Also, continuous heating/cooling operations can be performed without stopping a system when an operation mode changes.

Figure 7:
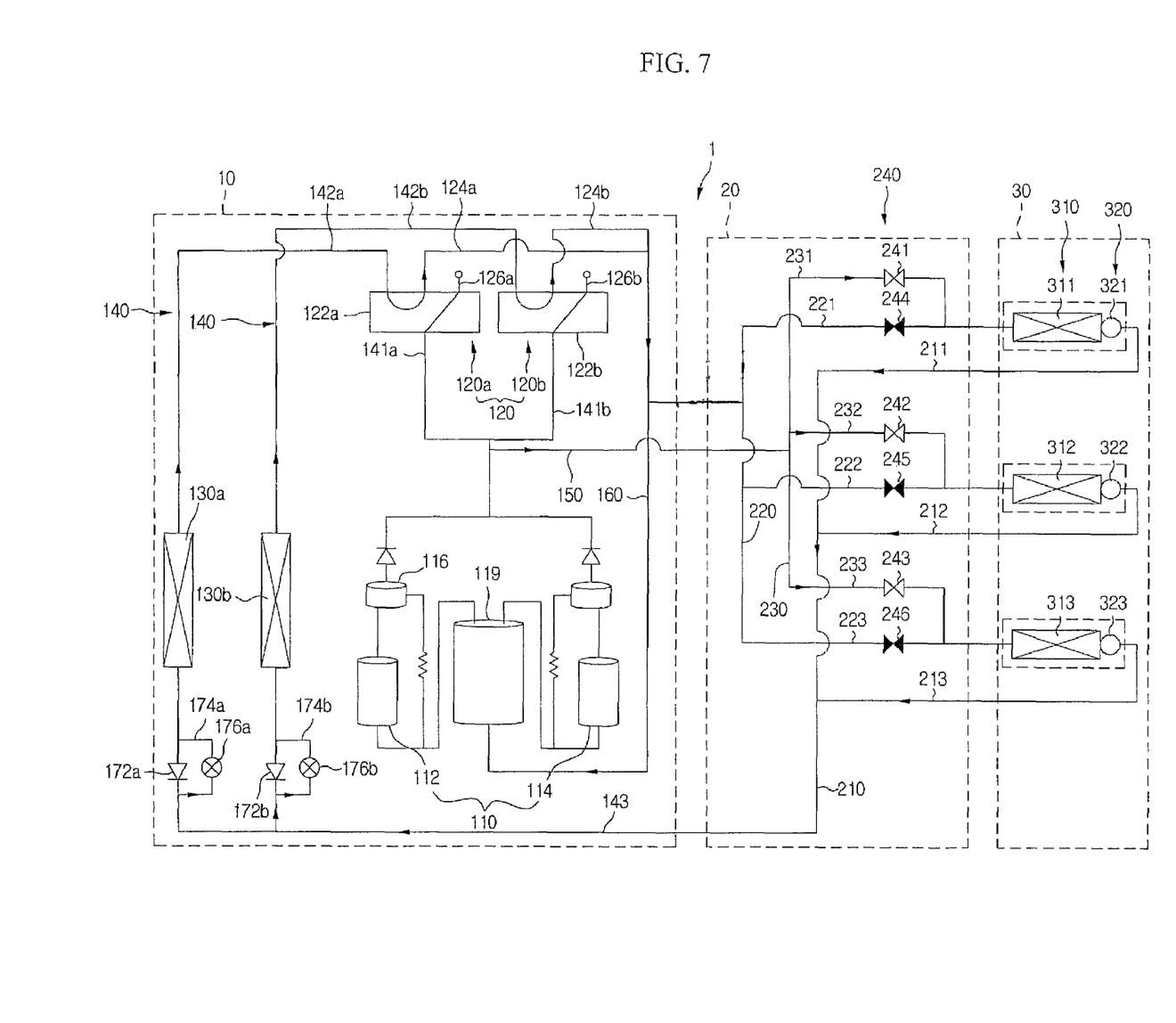
FIG. 7 is a view illustrating an operational state of the multi air conditioner when the multi air conditioner operates in a full heating mode.

FIG. 7 is a view illustrating an operational state when the simultaneous heating/cooling multi air conditioner operates in a full heating mode.

Referring to FIG. 7, in the full heating mode, the low-pressure side valves 244, 245 and 26 of the respective low-pressure gaseous refrigerant branch pipes 221, 222 and 223 are closed, and the high-pressure side valves 241, 242 and 243 of the respective high-pressure gaseous refrigerant branch pipes 231, 232 and 233 are opened. A high-pressure gaseous refrigerant discharged from the compressor 110 flows along the front end side 141 of the first connection pipe 140. Then, by the operation of the switching unit 120, all of the high-pressure gaseous refrigerant is introduced to the high-pressure gaseous refrigerant connection pipe 230 of the divider 20 via the second connection pipe 150, without passing through the outdoor heat exchangers 130.

The refrigerant introduced to the high-pressure gaseous refrigerant connection pipe 230 of the divider 20 is introduced to the high-pressure gaseous refrigerant branch pipes 231, 232 and 233, and is condensed while passing through each indoor heat exchanger 311, 312, 313. The air blown through the indoor heat exchangers 311, 312, 313 increases in temperature while passing through each indoor heat exchanger, and then is discharged to the inside to heat each room.

Thereafter, the condensed refrigerant passes through the indoor electronic expansion valves 311, 312, 313, and then flows along the high-pressure liquefied refrigerant branch pipes 211, 212, and 213, and into the high-pressure liquefied refrigerant connection pipe 210. The refrigerant in the high-pressure liquefied refrigerant connection pipe 210 flows along the high-pressure liquefied refrigerant section 143 of the first connection pipe 140, and is expanded while passing through the outdoor electronic expansion valves 176a and 176b. The check valves 172a and 172b ensure that the refrigerant must pass through the expansion valves 176a, 176b. The expanded refrigerant is evaporated while passing through each outdoor heat exchanger 130. Each outdoor heat exchanger 130 operates as an evaporator.

The evaporated refrigerant flows along the rear end side 142a and 142b of the first connection pipe 140, sequentially passes through the auxiliary connection pipes 124a and 124b and the third connection pipe 160 by the 4-way valves 122a and 122b, and then is introduced to the compressor 110. Because the operation of the switching unit 120 is the same as that described with reference to FIG. 6, a detailed description thereof will be omitted.

Figure 8:
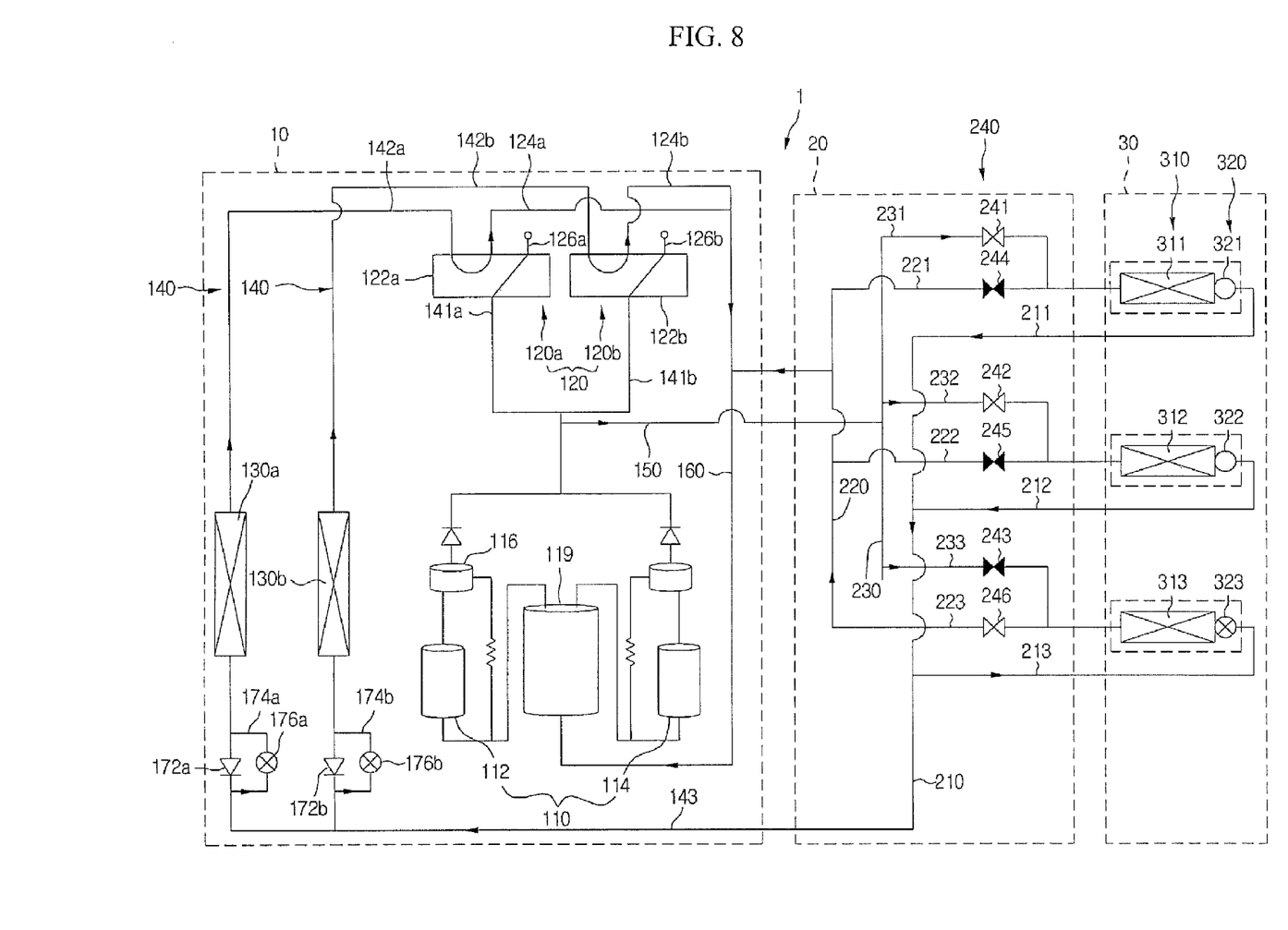
FIG. 8 is a view illustrating an operational state of the multi air conditioner when the multi air conditioner operates in a heating-dominant mode.

FIG. 8 is a view illustrating an operational state when the simultaneous heating/cooling multi air conditioner operates in a heating-dominant mode.

Referring to FIG. 8, in the heating-dominant mode, the low-pressure side valve 246 of the low-pressure gaseous refrigerant branch pipe 223 is opened for a room that requires cooling, so that refrigerant flows to the low-pressure gaseous refrigerant branch pipe 223. The high-pressure side valves 241 and 242 of the respective high-pressure gaseous refrigerant branch pipes 231 and 232 are opened for rooms that require heating, so that refrigerant flows to the high-pressure gaseous refrigerant branch pipes 231 and 232.

A high-pressure gaseous refrigerant discharged from the compressor 110 flows along the front end side 141 of the first connection pipe 140. Then, because the switching units 122a and 122b are configured as shown in FIG. 6, all of the high-pressure gaseous refrigerant is introduced to the high-pressure gaseous refrigerant connection pipe 230 of the divider 20 via the second connection pipe 150, without passing through the outdoor heat exchangers 130.

The refrigerant introduced to the high-pressure gaseous refrigerant connection pipe 230 is divided into the first and second high-pressure gaseous refrigerant branch pipes 231 and 232, and is condensed while passing through the first and second indoor heat exchangers 311 and 312, respectively. The air blown through the first and second indoor heat exchangers 311 and 322 is discharged to the inside of the first and second rooms at a temperature increased by heat-exchange, thereby heating rooms that require heating.

Thereafter, the condensed refrigerant passes through the first and second indoor electronic expansion valves 321 and 322, passes through the first and second high-pressure liquefied refrigerant branch pipes 211 and 212, and merges into the high-pressure liquefied refrigerant connection pipe 210. Here, a portion of the condensed refrigerant is introduced from the high-pressure liquefied refrigerant connection pipe 210 to the high-pressure liquefied refrigerant section 143 of the first connection pipe 140. The introduced refrigerant is expanded while passing through the outdoor electronic expansion valves 176a and 176b. The check valves 172a and 172b ensure that the refrigerant must pass through the expansion valves 176a, 176b. The expanded refrigerant is evaporated while passing through each outdoor heat exchanger 130a, 130b.

The evaporated refrigerant is introduced to the rear end sides 142a and 142b of the first connection pipe 140, sequentially passes through the auxiliary connection pipes 124a and 124b and the third connection pipe 160 by the 4-way valves 122a and 122b, and is introduced to the compressor 110.

A remaining portion of the condensed refrigerant is introduced from the high-pressure liquefied refrigerant connection pipe 210 to the third high-pressure liquefied refrigerant branch pipe 213, and is expanded while passing through the third indoor electronic expansion valve 323. The air indoor air cooled in the third indoor heat exchanger 313 is discharged to the inside of the third room, thereby cooling a room that requires cooling. Thereafter, the evaporated refrigerant is introduced to the low-pressure gaseous refrigerant connection pipe 220 via the third low-pressure gaseous refrigerant branch pipe 223. The refrigerant introduced to the low-pressure gaseous refrigerant connection pipe 220 is sucked to the compressor 110.

Figure 9:
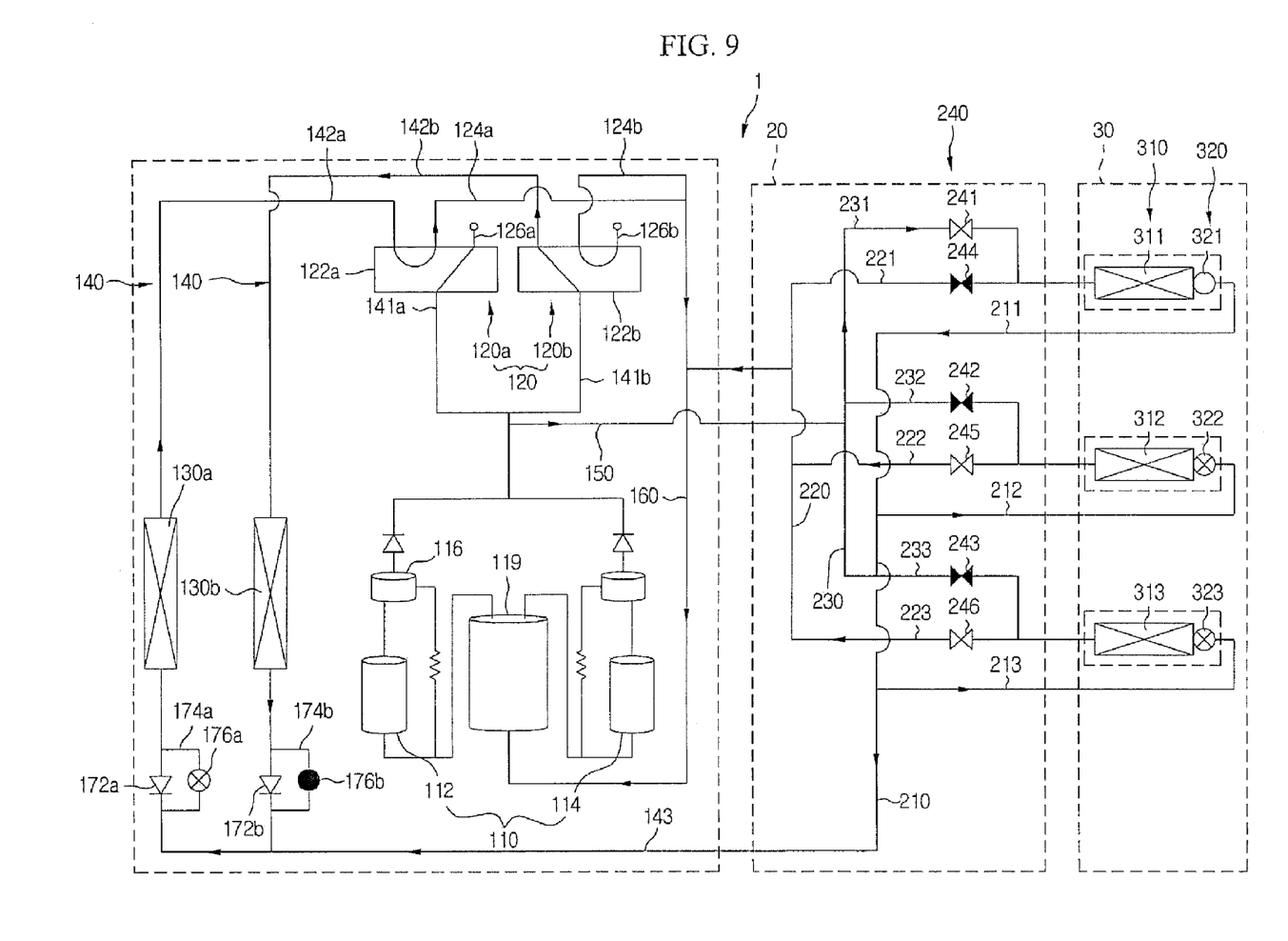
FIG. 9 is a view illustrating an operational state of the multi air conditioner when the multi air conditioner operates in a full heating mode or a heating-dominant mode.

FIG. 9 is a view illustrating an operational state for the system which is adopted when a cooling ratio increases while the simultaneous heating/cooling multi air conditioner was previously operating in the full heating mode or the heating-dominant mode. When the cooling ratio increases while the simultaneous heating/cooling multi air conditioner operates in the full heating mode or the heating-dominant mode, some of the outdoor heat exchangers 130 operate as evaporators, and others operate as condensers.

That is, when the simultaneous heating/cooling multi air conditioner including a plurality of indoor units operates in the full heating mode or the heating-dominant mode, each outdoor heat exchanger 130 operates as an evaporator as described above with reference to FIGS. 7 and 8. An indoor heat exchanger of a room requiring cooling serves as an evaporator, and an indoor heat exchanger of a room operating for heating serves as a condenser.

When the ratio of the indoor units performing cooling increases, the number of heat exchangers operating as condensers decreases within the entire system, thereby lowering condensing performance and deteriorating heating and cooling performance. In order to prevent deterioration of the heating and cooling performance, some of the plurality of outdoor heat exchangers operating as evaporators are switched so that they operate as condensers instead.

In detail, a high-pressure gaseous refrigerant discharged from the compressor 110 flows to the first front end side 141a and the second front end side 141b of the first connection pipe 140, and into the second connection pipe 150. The refrigerant introduced to the first front end side 141a of the first connection pipe 140 cannot flow further because the first switching unit 120a is configured as shown in FIG. 6. In contrast, the refrigerant introduced to the second front end side 141b of the first connection pipe 140 is introduced to the second rear end side 142b of the first connection pipe 140 by the second switching unit 120b.

The refrigerant introduced to the second connection pipe 150 is introduced to the high-pressure gaseous refrigerant connection pipe 230 of the divider 20. The refrigerant introduced to the high-pressure gaseous refrigerant connection pipe 230 flows to the first high-pressure gaseous refrigerant branch pipe 231, and is condensed while passing through the first indoor heat exchanger 311. The air blown through the first indoor heat exchanger 311 is discharged to the inside at a temperature increased by heat exchange, thereby heating a room that requires heating.

Thereafter, the condensed refrigerant passes through the first indoor electronic expansion valve 321, then flows along the first high-pressure liquefied refrigerant branch pipe 211, and a portion of the refrigerant is introduced to the high-pressure liquefied refrigerant connection pipe 210.

The portion of the condensed refrigerant flowing along the high-pressure liquefied refrigerant connection pipe 210 is introduced to the high-pressure liquefied refrigerant section 143 of the first connection pipe 140. Then, the introduced refrigerant is expanded while passing through the first outdoor electronic expansion valve 176*a*. The first check valve 172*a* ensures that the refrigerant must pass through the first expansion valve 176*a*. The refrigerant is then evaporated while passing through the first outdoor heat exchanger 130*a*. That is, the first outdoor heat exchanger 130*a* operates as an evaporator.

The evaporated refrigerant is introduced to the first rear end side 142*a* of the first connection pipe 140, and sequentially passes through the first auxiliary connection pipe 124*a* and the third connection pipe 160 by the first 4-way valve 122*a*. Then, the refrigerant is introduced to the compressor 110.

The remaining portion of the condensed refrigerant coming from the first high pressure liquefied refrigerant branch pipe 211 is introduced into the second and third liquefied refrigerant branch pipes 212 and 213. The introduced refrigerant is expanded while passing through the second and third indoor electronic expansion valves 322 and 323, and is evaporated while passing through the second and third indoor heat exchangers 312 and 313. The indoor air blown through the second and third indoor heat exchangers 312 and 313 is discharged to the inside, thereby cooling rooms that require cooling.

The evaporated refrigerant is introduced to the low-pressure gaseous refrigerant connection pipe 220 via the second and third low-pressure gaseous refrigerant branch pipes 222 and 223. The refrigerant introduced to the low-pressure gaseous refrigerant connection pipe 220 is sucked to the compressor 110.

The refrigerant discharged from the compressor 110 and introduced to the second rear end side 142*b* of the first connection pipe 140 by the second switching unit 120*b* is condensed while passing through the second outdoor heat exchanger 130*b*. That is, the second outdoor heat exchanger 130*b* operates as a condenser. The refrigerant condensed while passing through the second outdoor heat exchanger 130*b* is introduced to the high-pressure liquefied refrigerant section 143 of the first connection pipe 140 via the second check valve 172*b*, and then flows toward the first outdoor heat exchanger 130*a*. Here, the second outdoor electronic expansion valve 176*b* is closed.

The simultaneous heating/cooling multi air conditioner described above can operate in the full heating mode for heating all rooms, the heating-dominant mode for cooling some of rooms while dominantly heating other rooms, the full cooling mode for cooling all of the rooms, and the cooling-dominant mode for heating some of the rooms while dominantly cooling other rooms.

When the heating/cooling ratio changes while the simultaneous heating/cooling multi air conditioner is operating in a specific mode, each outdoor heat exchanger selectively operates as a condenser or an evaporator. Thus, the cooling performance and the heating performance can be optimally maintained.

Also, since a plurality of outdoor heat exchangers are configured to operate individually as condensers or evaporators, depending on a desired heating/cooling ratio, heating/cooling performance is not deteriorated even if the heating/cooling ratio changes, and continuous heating/cooling operations can be performed without stopping a system when the operation mode changes. Performance is not lowered even if the heating/cooling ratio changes. Also, even if the operation mode changes, continuous heating/cooling operation can be implemented without stopping the system. For this reason, the industrial applicability is high.

Although embodiments a number of illustrative embodiments have been described, it should be understood that numerous other modifications and embodiments can be devised by those skilled in the art that will fall within the spirit and scope of the principles of this disclosure. More particularly, variations and modifications are possible in the component parts and/or arrangements of the subject combinations which would fall within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

What is claimed is:

1. A heat pump, comprising:
   at least one compressor;
   a plurality of indoor devices, wherein each of the plurality of indoor devices includes an indoor heat exchanger which operates as a condenser or evaporator to heat or cool a different indoor room;
   an outdoor device coupled to the plurality of indoor devices, wherein the outdoor device includes a plurality of outdoor heat exchangers, and wherein each of the plurality of outdoor heat exchangers operates as either a condenser or an evaporator;
   a divider that couples the outdoor device to the plurality of indoor devices through a plurality of valves; and
   a plurality of switching devices, wherein:
   each of the plurality of switching devices couples one of the plurality of outdoor heat exchangers to the at least one compressor,
   the plurality of switching devices controls a flow of refrigerant between the at least one compressor and the plurality of outdoor heat exchangers,
   each indoor heat exchanger is coupled to first and second valves, the first and second valves set to opposing states to control a direction of flow of refrigerant into the indoor heat exchanger, and arranged to return refrigerant passing through the indoor heat exchanger to the at least one compressor along a path that bypasses indoor heat exchangers of remaining ones of the indoor devices,
   when the heat pump operates in a cooling dominant mode for heating a first number of rooms while simultaneously cooling a second number of rooms greater than the first number, all of the plurality of outdoor heat exchangers operate as condensers,
   when the heat pump operates in the cooling dominant mode and a ratio of the plurality of indoor devices performing heating to the plurality of indoor devices performing cooling increases above a predetermined amount, at least one of the plurality of outdoor heat exchangers switches from operating as a condenser to operating as an evaporator, and when the at least one of the plurality of outdoor heat exchangers operates as a condenser and at least one of the plurality of outdoor heat exchangers operates as an evaporator, at least a portion of refrigerant discharged from the at least one of the plurality of outdoor heat exchangers operating as a condenser is directly introduced into the at least one of the plurality of outdoor heat exchangers operating as an evaporator in the cooling dominant mode without passing through the at least one compressor, and the other portion of refrigerant discharged from the at least one of the plurality of outdoor heat exchangers operating as a condenser is introduced into at least one of the indoor heat exchangers which operates as an evaporator.

2. The heat pump of claim 1, further comprising:
a plurality of check valves, wherein each of the plurality of check valves is provided in one of a plurality of connection pipes, respectively, that connects one of the plurality of outdoor heat exchangers with the divider, and wherein the plurality of check valves allows refrigerant in the plurality of connection pipes to flow only from the plurality of outdoor heat exchangers to the divider;
a plurality of parallel pipes, wherein each of the plurality of parallel pipes is connected to one of the plurality of outdoor heat exchangers, respectively, and wherein each of the plurality of parallel pipes is connected in parallel to one of the plurality of connection pipes; and
a plurality of outdoor expansion valves, wherein each of the plurality of outdoor expansion valves is provided on one of the plurality of parallel pipes, respectively.

3. The heat pump of claim 1, comprising:
wherein, when the heat pump operates in a heating dominant mode for cooling a first number of rooms while simultaneously heating a second number of rooms greater than the first number of rooms, all of the plurality of outdoor heat exchangers operate as evaporators,
when the heat pump operates in a heating dominant mode, and a ratio of the plurality of indoor devices performing cooling to the plurality of indoor devices performing heating increases above a predetermined amount, at least one of the plurality of outdoor heat exchangers switches from operating as an evaporator to operating as a condenser, and
when the at least one of the plurality of outdoor heat exchangers operates as a condenser and at least one of the plurality of outdoor heat exchangers operates as an evaporator, at least a portion of refrigerant discharged from the at least one of the plurality of outdoor heat exchangers operating as a condenser is directly introduced into the at least one of the plurality of outdoor heat exchangers operating as an evaporator without passing through the at least one compressor.

4. The heat pump of claim 1, wherein the plurality of switching devices are configured such that at least one of the plurality of outdoor heat exchangers communicates with a discharge side of the at least one compressor when the at least one of the plurality of outdoor heat exchangers operates as a condenser, and at least one of the plurality of outdoor heat exchangers communicates with a suction side of the at least one compressor when the at least one of the plurality of outdoor heat exchangers operates as an evaporator.

5. The heat pump of claim 1, wherein the divider is configured to route high-pressure gaseous refrigerant output from the at least one compressor to at least one of the plurality of indoor devices that is performing a heating operation.

6. The heat pump of claim 3, wherein the divider is configured to route high-pressure liquid refrigerant output from the at least one of the plurality of outdoor heat exchangers operating as a condenser to at least one of the plurality of indoor devices that is performing a cooling operation.

7. The heat pump of claim 1, wherein when the heat pump is operating in a cooling dominant mode, all of the plurality of outdoor heat exchangers operate as condensers, and wherein the divider is configured to route the high-pressure liquid refrigerant output from all of the plurality of outdoor heat exchangers operating as condensers to the plurality of indoor devices.

8. The heat pump of claim 1, wherein when the at least one of the plurality of outdoor heat exchangers operates as a condenser, at least one corresponding switching device of the plurality of switching devices couples a discharge side of the at least one compressor to the at least one of the plurality of outdoor heat exchangers.

9. The heat pump of claim 1, wherein when at least one of the plurality of outdoor heat exchangers operates as an evaporator, at least one corresponding switching device of the plurality of switching devices couples the at least one of the plurality of outdoor heat exchangers to a suction side of the at least one compressor.

10. The heat pump of claim 1, wherein the at least one compressor includes one of a constant speed compressor or a variable speed compressor.

11. The heat pump of claim 3, wherein the at least one compressor includes one of a constant speed compressor or a variable speed compressor.

12. The heat pump of claim 1, wherein:
a first one of the switches includes a first valve body that moves reciprocally between first and second positions,
in the first position, the first valve body fluidly connects a first pipe to a flow stopping surface to cause the refrigerant to flow from an inlet of the switch to a second pipe, the second pipe directing the refrigerant flow from the at least one compressor to a first one of the outdoor heat exchangers, and in the second position, the first valve body fluidly connects the first pipe to the second pipe to direct the refrigerant to flow to the at least one compressor.

13. The heat pump of claim 12, wherein the flow of refrigerant from the inlet of the first switch to the second pipe exerts a force against the first valve body to hold the first valve body in the first position.

14. The heat pump of claim 12, wherein:
when the first valve body is in the first position, said first one of the outdoor heat exchangers outputs the refrigerant to flow into at least one of the indoor heat exchangers operating as an evaporator to cool a corresponding room.

15. The heat pump of claim 14, wherein:
when the first valve body is in the second position, refrigerant is received from the first one of the outdoor heat exchangers from the second pipe, the refrigerant flows from the second pipe to the first pipe through the first valve body, and is directed through the first pipe towards the at least one compressor.

16. The heat pump of claim 15, wherein the first valve body includes a channel for carrying the flow of refrigerant from the first pipe to the flow stopping surface in the first position and from the second pipe to the first pipe in the second position.

17. The heat pump of claim 16, wherein the flow stopping surface is included at a terminal end of a closed pipe.

18. The heat pump of claim 12, wherein:
a second one of the switches includes a second valve body that moves reciprocally between first and second positions, in the first position, the second valve body fluidly connects a third pipe to another flow stopping surface to cause the refrigerant to flow from an inlet of the second switch to a fourth pipe, the fourth pipe directing the refrigerant flow from the at least one compressor to a second one of the outdoor heat exchangers, and in the second position, the second valve body fluidly connects the third pipe to the fourth pipe to direct the refrigerant to flow to the at least one compressor.

19. The heat pump of claim 18, wherein the flow of refrigerant from the inlet of the second switch to the fourth pipe exerts a force against the second valve body to hold the second valve body in the first position.

20. The heat pump of claim 18, wherein:
when the second valve body is in the first position, said second one of the outdoor heat exchangers outputs refrigerant to flow into at least one of the indoor heat exchangers operating as an evaporator to cool a corresponding room.

21. The heat pump of claim 20, wherein:
when the second valve body is in the second position, refrigerant is received from the second one of the outdoor heat exchangers from the fourth pipe, the refrigerant flows from the fourth pipe to the third pipe through the second valve body, and is directed through the third pipe towards the at least one compressor.

22. The heat pump of claim 21, wherein the second valve body includes a channel for carrying the flow of refrigerant from the third pipe to said another flow stopping surface in the first position and from the fourth pipe to the third pipe in the second position.

23. The heat pump of claim 22, wherein said another flow stopping surface is included at a terminal end of another closed pipe.

24. The heat pump of claim 22, wherein:
all the indoor heat exchangers operate as evaporators for cooling respective ones of the rooms when the first valve body and the second valve body are in the first position.

25. The heat pump of claim 22, wherein:
wherein indoor heat exchangers, coupled to the first and second ones of the outdoor heat exchangers, operate as evaporators to cool respective rooms when the first body valve and the second body valve are in the first position, and at least one other indoor heat exchanger receives a flow of refrigerant from the at least one compressor along a flow path that bypasses the first and second ones of the outdoor heat exchangers, said at least one other indoor heat exchanger simultaneously operating as a condenser to heat a respective room.

26. The heat pump of claim 22, wherein:
one or more indoor heat exchangers are coupled to the first one of the outdoor heat exchangers for cooling, and one or more other indoor heat exchangers are coupled to the at least one compressor for heating, when the first valve body is in one of the first or second positions and the second valve body is in the other one of the first or second positions.

27. The heat pump of claim 26, wherein the first one of the outdoor heat exchangers operates as an evaporator and the second one of the outdoor heat exchangers operates as a condenser.

* * * * *